(12) United States Patent
Silverman et al.

(10) Patent No.: US 12,144,345 B2
(45) Date of Patent: Nov. 19, 2024

(54) SUCCINATE DEHYDROGENASE INHIBITORS FOR BREAKING DORMANCY

(71) Applicant: Valent BioSciences LLC, Libertyville, IL (US)

(72) Inventors: Franklin Paul Silverman, Highland Park, IL (US); Dale O Wilson, Jr., Round Lake Beach, IL (US)

(73) Assignee: VALENT BIOSCIENCES LLC, Libertyville, IL (US)

(*) Notice: Subject to any disclaimer, the term of this patent is extended or adjusted under 35 U.S.C. 154(b) by 240 days.

(21) Appl. No.: 17/706,759

(22) Filed: Mar. 29, 2022

(65) Prior Publication Data

US 2022/0313662 A1    Oct. 6, 2022

Related U.S. Application Data

(60) Provisional application No. 63/167,757, filed on Mar. 30, 2021.

(51) Int. Cl.
 *A01N 37/04*    (2006.01)
 *A01N 43/56*    (2006.01)
 *A01P 21/00*    (2006.01)

(52) U.S. Cl.
 CPC .......... *A01N 37/04* (2013.01); *A01N 43/56* (2013.01); *A01P 21/00* (2021.08)

(58) Field of Classification Search
 CPC .... A01P 3/00; A01P 7/04; A01P 21/00; A01P 7/02; A01P 1/00; A01P 13/00; A01P 5/00; A01N 43/40; A01N 25/28; A01N 25/04; A01N 43/90; A01N 43/56; A01N 43/80; A01N 25/30; A01N 37/22; A01N 43/10; A01N 63/22; A01N 63/23; A01N 43/12; A01N 33/12; A01N 43/78; A01N 47/12; A01N 59/02; A01N 59/26; A01N 43/22; A01N 43/30; A01N 43/58; A01N 43/76; A01N 47/30; A01N 51/00; A01N 53/00; A01N 25/10; A01N 25/12; A01N 37/20; A01N 41/10; A01N 43/16; A01N 43/32; A01N 43/713; A01N 43/82
 See application file for complete search history.

(56) References Cited

U.S. PATENT DOCUMENTS

| | | |
|---|---|---|
| 2010/0222397 A1 | 9/2010 | Labourdette et al. |
| 2016/0198713 A1 | 7/2016 | Hillebrand et al. |
| 2018/0317497 A1 | 11/2018 | McKenry |
| 2019/0327970 A1* | 10/2019 | Tanaka ................... A01N 43/50 |

FOREIGN PATENT DOCUMENTS

| | | | |
|---|---|---|---|
| WO | 1987005781 A2 | 10/1987 | |
| WO | WO-2019224280 A1 * | 11/2019 | ............. A01N 25/04 |

OTHER PUBLICATIONS

International Search Report and Written Opinion dated Jun. 16, 2022.

* cited by examiner

*Primary Examiner* — Audrea B Coniglio
(74) *Attorney, Agent, or Firm* — Wood, Phillips, Katz, Clark & Mortimer

(57) ABSTRACT

The present invention is directed to methods of promoting bud break in woody perennial plants by applying succinate dehydrogenase inhibitors. The present invention is further directed to methods of synchronizing bud break in woody perennial plants by applying succinate dehydrogenase inhibitors. The present invention is directed to methods of promoting growth in woody perennial plants by applying succinate dehydrogenase inhibitors.

19 Claims, No Drawings

SUCCINATE DEHYDROGENASE INHIBITORS FOR BREAKING DORMANCY

FIELD OF THE INVENTION

The present invention is directed to methods of promoting bud break in woody perennial plants by applying succinate dehydrogenase inhibitors. The present invention is further directed to methods of synchronizing bud break in woody perennial plants by applying succinate dehydrogenase inhibitors. The present invention is further directed to methods of promoting growth in woody perennial plants by applying succinate dehydrogenase inhibitors.

BACKGROUND OF THE INVENTION

Woody perennial plants such as deciduous fruit trees and grape vines require chilling temperatures between growing seasons to properly bear an acceptable fruit yield. Specifically, the plants develop a resting bud at the conclusion of the growing season that is more likely to survive between growing seasons. This bud stage is known as dormancy. In order for dormancy to be broken and woody perennial plant growth to resume, a threshold amount of chilling is required. Effective chilling is based on both the duration of chilling and the temperature of the chilling period. This is normally followed by elevated temperatures that break dormancy and lead to synchronous flowering and fruit development. This breaking of dormancy in woody perennial plants is known as bud break.

The most commercially successful bud dormancy breaking chemical is hydrogen cyanamide ("HC"). HC is the active agent in Dormex® (Dormex is a registered trademark of and available from AlzChem AG, Germany). In addition to compensating for a lack of chilling, HC has been used to initiate earlier and more synchronous bud break leading to increased fruit uniformity and fruit yields. However, HC is highly toxic and has been shown to result in adverse human health effects from contact with the skin and/or mucous membranes. See, Schep et al., The adverse effects of hydrogen cyanamide on human health: an evaluation of inquiries to the New Zealand National Poisons Centre. Clin Toxicol (Phila). 2009 47(1):58-60 and Update: hydrogen cyanamide-related illnesses—Italy, 2002-2004, MMWR Morb Mortal Wkly Rep, 2005 Apr. 29, 54(16), 405-408. Moreover, high rates of HC are associated with in-season phytotoxicity and repeated use may result in long-term decline in vine health and yield.

Accordingly, there is a need in the art for a composition that can break bud dormancy as well or better than hydrogen cyanamide, but without causing negative plant or animal health issues.

SUMMARY OF THE INVENTION

The present invention is directed to a method of promoting bud break in woody perennial plants comprising applying succinate dehydrogenase inhibitors to the plant.

The present invention is further directed to a method of synchronizing bud break in woody perennial plants comprising applying succinate dehydrogenase inhibitors to the plant.

The present invention is further directed to a method of promoting plant growth in woody perennial plants comprising applying succinate dehydrogenase inhibitors to the plant.

DETAILED DESCRIPTION OF THE INVENTION

Applicant has unexpectedly found that succinate dehydrogenase inhibitors ("SDHIs") promote and synchronize bud break in woody perennials and promote shoot growth in woody perennials. Promotion and synchronization of bud break of woody perennials and shoot growth in woody perennials by SDHIs is unexpected as SDHIs are a class of anti-fungal compounds known to control turfgrass diseases such as dollar spot and fairy ring among others. Other than anti-fungal activity SDHIs have also been shown to control nematodes.

In one embodiment, the present invention is directed to methods of promoting bud break in woody perennial plants comprising applying an effective amount of one or more succinate dehydrogenase inhibitors to the plant, preferably a dormant plant.

In another embodiment, the present invention is further directed to methods of synchronizing bud break in woody perennial plants comprising applying an effective amount of one or more succinate dehydrogenase inhibitors to the plant.

In one embodiment, the present invention is directed to methods of promoting plant growth in woody perennial plants comprising applying an effective amount of one or more succinate dehydrogenase inhibitors to the plant. In a preferred embodiment, the plant growth is increased shoot weight.

SDHIs suitable for use in the present invention include, but are not limited to, benodanil, benzovindiflupyr, bixafen, boscalid, carboxin, fenfuram, fluopyram, flutolanil, fluxapyroxad, furametpyr, inpyrfluxam, isofetamid, isopyrazam, malonic acid, mepronil, methyl malonic acid, oxycarboxin, penflufen, penthiopyrad, pydiflumetofen, pyraziflumid, sedaxane, thifluzamide, mixtures thereof and salts thereof. In a preferred embodiment the SDHI is selected from the group consisting of malonic acid, inpyrfluxam, penthiopyrad, pydiflumetofen, mixtures thereof and salts thereof. In a more preferred embodiment, the SDHI is selected from the group consisting of malonic acid, inpyrfluxam, penthiopyrad, pydiflumetofen, mixtures thereof and salts thereof.

Salts that can be used in accordance with the current invention include but are not limited to hydrochloride, dihydrate hydrochloride, hydrobromide, hydroiodide, nitrate, sulfate, bisulfate, phosphate, acid phosphate, isonicotinate, acetate, lactate, potassium, salicylate, citrate, tartrate, pantothenate, bitartrate, ascorbate, succinate, mesylate, maleate, gentisinate, fumarate, tannate, sulphate, tosylate, esylate, gluconate, glucaronate, saccharate, formate, benzoate, glutamate, methanesulfonate, ethanesulfonate, benzensulfonate, p-toluenesulfonate and pamoate (i.e., 1,1'-methylene-bis-(2-hydroxy-3-naphthoate)) salts.

In a preferred embodiment, the effective amount of one or more SDHIs is from about 1 to about 10,000 parts per million ("ppm"), preferably from about 300 to about 10,000 ppm, more preferably from about 400 to about 2,000 ppm and most preferably about 97.2, 194.4, 397.2, 486, 968, 1,428, 1,486, 3,000 or 10,000 ppm.

Woody perennial plants refer to plants with stems that do not die back to the ground from which they grew and include, but are not limited to, grape vines, kiwifruit vines, stone fruit trees including but not limited to peach trees, nectarine trees, apricot trees, and cherry trees, apple trees, pear trees, blueberry bushes, brambles including raspberry and blackberry. In a preferred embodiment, the woody perennial plant is a grape vine.

In another embodiment, woody perennial plants do not include grape vines.

As used herein the phrase "breaking bud dormancy" or "bud break" refers to the initiation of growth from the bud following a period of dormancy.

As used herein the term "promoting" refers to earlier initiating or enhancing.

As used herein, all numerical values relating to amounts, ratios, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

The articles "a," "an" and "the" are intended to include the plural as well as the singular, unless the context clearly indicates otherwise. For example, the methods of the present invention are directed to promoting bud break in a woody perennial plant, but this can include promotion of bud break in multiple woody perennials (such as a more than one grape vine or more than one species of woody perennial plant).

As used herein, "effective amount" refers to the amount of the one or more SDHIs or salts thereof that will improve bud break and or increase bud break synchrony. The "effective amount" will vary depending on the SDHI or salt thereof concentration, the plant species or variety being treated, the result desired, and the life stage of the plants, among other factors. Thus, it is not always possible to specify an exact "effective amount."

These representative embodiments are in no way limiting and are described solely to illustrate some aspects of the invention.

The following example is offered by way of illustration only and not by way of limitation.

EXAMPLES

Dormex® was used as the source of hydrogen cyanamide. Dormex is a registered trademark of and available from Alzchem Trostberg Gmbh.

CAN17 is a 17-0-0 fertilizer. CAN17 contains 17% total nitrogen as 4.6% ammonium nitrogen and 11.6% nitrate nitrogen and 1.3% urea nitrogen and 8.8% calcium derived from ammonium nitrate and calcium nitrate. CAN17 is available from J.R. Simplot Company (Boise, ID, USA).

Excalia® was used as the source of inpyrfluxam. Excalia is a registered trademark of and available from Sumitomo Chemical Company Limited.

Fontelis® was used as the source of penthiopyrad. Fontelis is a registered trademark of and available from E. I. du Pont de Nemours and Company.

Miravis® was used as the source of pydiflumetofen. Miravis is a registered trademark of and available from Syngenta Participations AG.

Example 1—Promoting and Synchronizing Bud Break and Increasing Shoot Weight in Grapes Method To assess the ability of SDHIs to promote and synchronize bud break and increase shoot weight, SDHIs were applied to shoots of potted 1 year old Concord grape vines grown in a greenhouse and examined for bud break (initiation of growth). Hydrogen cyanamide, malonate (malonic acid), inpyrfluxam, penthiopyrad and pydiflumetofen were each applied individually to the shoots of five potted concord grape rootstocks that were pruned to 5 nodes. Plants were evaluated for bud break periodically starting at 5 days after treatment. Plants were evaluated for shoot weight at 41 days after treatment. Results of these evaluations can be seen below in Table 1, below.

Results

TABLE 1

| | Days to 50% BB | Days to 100% BB | Shoot Weight (g) |
|---|---|---|---|
| Control | 12 | 21 | 32.6 |
| Hydrogen cyanamide (2% v/v) | 12 | 17 | 27.4 |
| CAN17 (30% w/w) | 12 | 8 | 34.2 |
| Malonate (3,000 ppm) | 7 | 19 | 41.75 |
| Malonate (10,000 ppm) | 7 | 17 | 51.4 |
| Inpyrfluxam (486 ppm) | 9 | 17 | 47 |
| Penthiopyrad (1,428 ppm) | 7 | 13 | 29.4 |
| Pydiflumetofen (968 ppm) | 9 | 26 | 24 |

As seen in Table 1, each of the SDHIs tested decreased the number of days to 50% bud break as compared to the industry standard hydrogen cyanamide, which had no effect. Specifically, application of malonate or penthiopyrad to Concord grape plants decreased the time to 50% bud break to 7 days or about 40% faster than control. Further, application of inpyrfluxam or pydiflumetofen decreased time to reach 50% bud break to 9 days or about 25% faster than control. The time to achieve 50% bud break indicates speed of bud break, wherein the shorter amount of time to 50% bud break the faster the bud break.

Further, as seen in Table 1, the majority of the SDHIs decreased the number of days to 100% bud break. Specifically, application of malonate at 3,000 ppm reduced the number of days to 100% bud break to 19 (10% faster than control) and at 10,000 ppm to 17 (19% faster than control). Application of inpyrfluxam reduced the number of days to 100% bud break to 17 and penthiopyrad to 13 (38% faster than control). 100% bud break indicates synchrony of bud break wherein the shorter the amount of time to 100% bud break the more synchronous the bud break.

Finally, as seen in Table 1, the majority of SDHIs increased shoot weight. Specifically, application of malonate at 3,000 ppm increased shoot weight to 41.75 grams (28% more than control) and at 10,000 ppm to 51.4 grams (58% more than control). Application of inpyrfluxam increased shoot weight to 47 grams (44% more than control).

Thus, SDHIs are capable of promoting and synchronizing bud break and increase shoot weight of grapes.

Example 2—Promoting and Synchronizing Bud Break in Grapes

Method

To assess the ability of SDHIs to promote and synchronize bud break and increase shoot weight, SDHIs were applied to shoots of 1 year old potted Concord grape vines grown in a greenhouse and examined for bud break (initiation of growth). Hydrogen cyanamide, malonate (malonic acid), inpyrfluxam, and mixtures of malonate and inpyrfluxam were each applied to the shoots of five potted concord grape rootstocks that were pruned to 5 nodes. Plants were evaluated for bud break periodically starting at 5 days after treatment. Plants were evaluated for shoot weight at 41 days after treatment. Results of these evaluations can be seen below in Table 2, below.

To determine if the mixtures provided unexpected results, the observed combined efficacy ("OCE") was divided by the expected combined efficacy ("ECE") to give an OCE/ECE ratio wherein the expected ECE is calculated by the Abbott method:

$$ECE=A+B-(AB/100),$$

wherein ECE is the expected combined efficacy and in which A and B are the efficacy provided by the single active ingredients. If the ratio between the OCE of the mixture and the ECE of the mixture is greater than 1, then greater than expected interactions are present in the mixture. (Gisi, *The American Phytopathological Society,* 86:11, 1273-1279, 1996).

Results

TABLE 2

|  | Days to 50% BB | OCE/ECE ratio | Days to 100% BB | OCE/ECE ratio | Shoot Weight (g) |
|---|---|---|---|---|---|
| Control | 25 |  | 16 |  | 9.2 |
| Hydrogen cyanamide (2% v/v) | 18 |  | 16 |  | 8.9 |
| Malonate (300 ppm) | 25 |  | 20 |  | 8.0 |
| Malonate (1,000 ppm) | 24 |  | 26 |  | 8.8 |
| Malonate (3,000 ppm) | 24 |  | 17 |  | 8.5 |
| Malonate (10,000 ppm) | 24 |  | 12 |  | 7.9 |
| Inpyrfluxam (97.2 ppm) | 27 |  | 17 |  | 9.1 |
| Inpyrfluxam (194.4 ppm) | 29 |  | 28 |  | 5.4 |
| Inpyrfluxam (486 ppm) | 22 |  | 13 |  | 7.6 |
| Inpyrfluxam (972 ppm) | 27 |  | 10 |  | 6.2 |
| Malonate (300 ppm) Inpyrfluxam (97.2 ppm) | 22 | 1.7 | 17 | −0.2 | 7.9 |
| Malonate (1000 ppm) Inpyrfluxam (486 ppm) | 25 | 0 | 9 | 5.1 | 6.6 |

As seen in Table 2, each of the SDHIs tested at particular concentrations decreased the number of days to 50% bud break as compared to the control. Specifically, application of malonate at 1,000 ppm, 3,000 ppm and 10,000 ppm to Concord grape stocks decreased the time to 50% bud break to 24 days or about 4% faster than control. Further, application of inpyrfluxam at 486 ppm decreased 50% bud break to 22 days or about 12% faster than control.

Applied individually malonate at 300 ppm and inpyrfluxam at 97.2 ppm either did not decrease time to 50% bud break or increased time to 50% bud break (25 days to 50% bud break for 300 ppm malonate and 27 days to 50% bud break for 97.2 ppm inpyrfluxam). However, the mixture of 300 ppm malonate and 97.2 ppm inpyrfluxam decreased time to 50% bud break to 22 days. This decrease resulted in an OCE/ECE ratio of 1.7 indicating unexpected results.

Further, as seen in Table 2, each of the SDHIs at particular concentrations decreased the number of days to 100% bud break as compared to control. Specifically, application of malonate at 10,000 ppm to Concord grape shoots decreased the time to 100% bud break to 12 days (25% faster than control). Application of inpyrfluxam at 486 ppm and 972 ppm reduced the number of days to 100% bud break to 13 and 10, respectively (19% and 38% faster than control, respectively).

Applied individually malonate at 1000 ppm and inpyrfluxam at 486 ppm either did not increase time to 100% bud break (26 days to 100% bud break) or decreased time to 100% bud break (13 days to 100% bud break). However, the mixture of 1000 ppm malonate and 486 ppm inpyrfluxam decreased time to 100% bud break to 9 days. This decrease resulted in an OCE/ECE ratio of 5.1 indicating unexpected results. Thus, SDHIs are capable of promoting and synchronizing bud break.

Example 3—Promoting Bud Break and Increasing Shoot Weight in Grapes

Method

Thompson seedless grapes were grown in the field in Kanoneiland, Northern Cape, South Africa during the 2021 growing season. Hydrogen cyanamide, malonate (malonic acid), and inpyrfluxam were each applied to the shoots of grape plants at 2 or 4 weeks before natural bud break. Plants were evaluated for bud break at 7 and 21 days after 1$^{st}$ bud break. Results of these evaluations can be seen below in Table 3, below.

TABLE 3

|  | Application Timing | Average buds (per cane) | Bud Break % at 7 days after 1$^{st}$ bud break | Bud Break % at 21 days after 1$^{st}$ bud break |
|---|---|---|---|---|
| Control | 4 weeks before natural bud break | 13.3 | 31.8 a | 77.2 abc |
| Hydrogen cyanamide (2% v/v) | 4 weeks before natural bud break | 13.0 | 63.2 b | 81.3 bcd |
| Malonate (10,000 ppm) | 4 weeks before natural bud break | 13.3 | 29 a | 87.5 cde |
| Inpyrfluxam (486 ppm) | 4 weeks before natural bud break | 12.6 | 36.8 a | 90.3 def |
| Malonate (10,000 ppm) | 2 weeks before natural bud break | 12.8 | 33.7 a | 98.2 ef |
| Inpyrfluxam (486 ppm) | 2 weeks before natural bud break | 12.2 | 29.7 a | 100 f |

TABLE 4

| | Application Timing | Shoot Growth | Shoot Growth (%) | | |
|---|---|---|---|---|---|
| | | | 1-5 cm | 5-10 cm | >10 cm |
| Control | 4 weeks before natural bud break | 51.8 | 23.2 | 20.4 | 8.2 a |
| Hydrogen cyanamide (2% v/v) | 4 weeks before natural bud break | 67.2 | 21.7 | 16.1 | 29.3 c |
| Malonate (10,000 ppm) | 4 weeks before natural bud break | 62 | 27.7 | 17.8 | 16.6 b |
| Inpyrfluxam (486 ppm) | 4 weeks before natural bud break | 65.8 | 25.9 | 20.3 | 19.7 b |
| Malonate (10,000 ppm) | 2 weeks before natural bud break | 74.5 | 23.3 | 19.1 | 32 c |
| Inpyrfluxam (486 ppm) | 2 weeks before natural bud break | 77.6 | 27.7 | 21.1 | 28.8 c |

Results

As demonstrated in Table 3, application of malonate or inpyrfluxam at 2 weeks before natural bud break resulted in a statistically significant increase over control in percentage of buds broken at 21 days after 1" bud break. Further, application of inpyrfluxam at 4 weeks before natural bud break resulted in a statistically significant increase over control in percentage of buds broken at 21 days after 1" bud break. Thus, application of SDHIs at each of 2 and 4 weeks before natural bud break results in greater bud break and bud break synchrony than the industry standard Dormex®.

As demonstrated in Table 4, application of malonate or inpyrfluxam at 2 weeks before natural bud break resulted in an increase in shoot growth over control and Dormex®. Specifically, malonate or inpyrfluxam applied at 2 weeks before natural bud break resulted in a 44% and 50% increase over control, respectively, and an 11% and 15% increase over Dormex®, respectively. Further, application of malonate or inpyrfluxam at 4 weeks before natural bud break resulted in an increase in shoot growth over control. Specifically, malonate or inpyrfluxam applied at 4 weeks before natural bud break resulted in a 20% and 27% increase over control, respectively.

What is claimed is:

1. A method of promoting bud break in woody perennial plants comprising applying an effective amount of one or more succinate dehydrogenase inhibitors (SDHIs) or salts thereof to the plant.

2. The method of claim 1, wherein the one or more SDHIs is selected from the group consisting of malonic acid, inpyrfluxam, penthiopyrad and pydiflumetofen.

3. The method of claim 1, wherein the effective amount is from about 1 to about 10,000 parts per million (ppm).

4. The method of claim 3, wherein the effective amount is from about 300 to about 10,000 ppm.

5. The method of claim 1, wherein the woody perennial plant is selected from the group consisting of grape vines, kiwifruit vines, stone fruit trees, apple trees, pear trees, blueberry bushes and brambles.

6. The method of claim 5, wherein the woody perennial plant is grape vines.

7. A method of synchronizing bud break in woody perennial plants comprising applying an effective amount of one or more succinate dehydrogenase inhibitors (SDHIs) or salts thereof to the plant.

8. The method of claim 7, wherein the one or more SDHIs is selected from the group consisting of malonic acid, inpyrfluxam, penthiopyrad and pydiflumetofen.

9. The method of claim 7, wherein the effective amount is from about 1 to about 10,000 parts per million (ppm).

10. The method of claim 9, wherein the effective amount is from about 300 to about 10,000 ppm.

11. The method of claim 7, wherein the woody perennial plant is selected from the group consisting of grape vines, kiwifruit vines, stone fruit trees, apple trees, pear trees, blueberry bushes and brambles.

12. The method of claim 11, wherein the woody perennial plant is grape vines.

13. A method of increasing plant growth in woody perennial plants comprising applying an effective amount of one or more succinate dehydrogenase inhibitors (SDHIs) or salts thereof to the plant.

14. The method of claim 13, wherein the one or more SDHIs is selected from the group consisting of malonic acid, inpyrfluxam, penthiopyrad and pydiflumetofen.

15. The method of claim 13, wherein the effective amount is from about 1 to about 10,000 parts per million (ppm).

16. The method of claim 15, wherein the effective amount is from about 300 to about 10,000 ppm.

17. The method of claim 13, wherein the woody perennial plant is selected from the group consisting of grape vines, kiwifruit vines, stone fruit trees, apple trees, pear trees, blueberry bushes and brambles.

18. The method of claim 17, wherein the woody perennial plant is grape vines.

19. The method of claim 13, wherein shoot weight of the plant is increased.

* * * * *